United States Patent [19]

Rusmussen et al.

[11] Patent Number: 4,470,171

[45] Date of Patent: Sep. 11, 1984

[54] COMPOSITE SHIRRED CASING ARTICLE AND METHOD

[75] Inventors: Jerome J. M. Rusmussen, Burbank; William F. Yearout, Jr., Oak Park, both of Ill.

[73] Assignee: Union Carbide Corporation, Danbury, Conn.

[21] Appl. No.: 431,469

[22] Filed: Sep. 30, 1982

[51] Int. Cl.³ .................... A22C 11/02; F16L 11/00
[52] U.S. Cl. ......................................... 17/49; 17/35; 17/41; 138/118.1; 426/105; 428/36
[58] Field of Search ............... 138/118.1; 17/1, 41, 17/42, 35, 49; 428/36; 426/105, 124, 129

[56] References Cited

U.S. PATENT DOCUMENTS

| 1,741,230 | 12/1929 | Hoy . | |
|---|---|---|---|
| 2,882,163 | 4/1959 | Knaff | 99/109 |
| 2,961,323 | 11/1960 | Underwood et al. | 99/176 |
| 3,378,379 | 4/1968 | Shiner et al. | 99/176 |
| 3,709,703 | 1/1973 | McNeill | 99/176 |
| 4,007,761 | 2/1977 | Beckman | 138/103 |
| 4,131,137 | 12/1978 | Lustig et al. | 138/118.1 |
| 4,162,693 | 7/1979 | Beckman | 138/118.1 |
| 4,192,904 | 3/1980 | Gerigk et al. | 428/36 |
| 4,197,326 | 4/1980 | Wakamatsu et al. | 426/412 |
| 4,205,611 | 6/1980 | Slawinski | 102/24 |
| 4,292,711 | 10/1981 | Becker | 17/49 |

FOREIGN PATENT DOCUMENTS

3012622 10/1981 Fed. Rep. of Germany .

Primary Examiner—William R. Dixon, Jr.
Attorney, Agent, or Firm—Roger Aceto

[57] ABSTRACT

Disclosed is a composite casing article comprising two or more shirred casing lengths. The two lengths are arranged end to end in tandem with each rearward length in the arrangement having an unshirred portion laced through the bore of each forward length in the arrangement. This allows all lengths to deshirr simultaneously during stuffing to form a multilayered casing wall. Also disclosed is a method for making the article and a stuffing method utilizing the article to produce a food product encased in a multilayered casing.

52 Claims, 7 Drawing Figures fig. 4.

COMPOSITE SHIRRED CASING ARTICLE AND METHOD

This invention relates to the art of making sausages or other stuffed products from shirred casing.

The desire to improve productivity and efficiency in this field has increased the demand for shirred casing, as opposed to cut lengths of flat stock, while at the same time demanding casing with enhanced or additional (oftentimes interfering) physical properties.

Shirred casing enhances productivity and efficiency because it allows a large number of sausages to be made from a single shirred casing stick in an automated operation, as opposed ro use of flat stock which requires an operator to place a cut length on a stuffing horn, stuff it out, then replace it with another and so on. Shirred casing can also reduce inventory problems in that any length sausage within the capabilities of the stuffing apparatus can be made from a given type of casing stick.

Efficient processing plant operations such as high speed stuffing, water cooking, water shower cooling, blast freezing, or more stringent end use requirements such as a demand for increased shelf life requires enhanced or additional casing properties. Among the physical casing properties which can be important are physical strength and toughness, tear resistance, the ability to control stuffed size, the ability to expand and contract as the stuffed product changes size during processing, barrier properties for oxygen, moisture, oil, and the like, adhesion properties, peelability properties, and others.

Although the adoption of shirred casing represents an increase in productivity since the operator does not handle each individual casing length, that very fact limits the opportunity to effectively utilize specialized or multi-layered casing. More particularly, with the use of cut lengths of flat stock, the operator individually handles each casing length for each sausage and is therefore in a position to give it whatever special attention is necessary. For example, Knaff U.S. Pat. No. 2,882,163 discloses a special double-layer casing for dry sausage in which the outer layer is designed to wrinkle and go baggy in the processing operation so that the outer layer with the mold and frost accumulated on it can be easily removed before retailing. The cut lengths of flat stock forming the respective layers are individually placed on the horn, one over the other, or alternatively the casing layers inserted one within the other before placing on the stuffing horn. The operator handles each cut length individually so that he can provide the necessary attention to assure that the specialized double-walled casing is properly used.

By way of contrast, with the use of shirred casing, the operator need only place the shirred casing stick on the stuffing horn following which little if any attention need be given the casing itself as the stuffing apparatus automatically stuffs and clips sausage after sausage until the casing stick, usually of 100 feet or more, is expended. Typically, these benefits of shirred casing are accompanied by the difficulty of providing a casing with characteristics which are often mutually incompatible or conflicting.

Various types of casing have already been developed and have been found satisfactory for many end use requirements in both shirred and cut length applications. For example, cellulosic casing, that is casing made of regenerated cellulose, has the ability when sufficiently moisturized or premoisturized to stretch as necessary during stuffing and processing operations. It is also able to contract as the processed article loses moisture, and it possesses reasonable physical strength. A particular class of cellulosic casing, namely fibrous casing, (cellulose casing reinforced with a paper or other fibrous web) is particularly useful for controlling stuffed and processed diameter, maintaining the product under pressure, and providing reasonable physical strength and toughness. Cellulosic casing is permeable to both air and moisture, which makes it both desirable for some operations such as smoking and unsuitable for others requiring an oxygen or moisture barrier.

Certain barrier films, such as some copolymers of polyvinylidene chloride, themselves possess excellent barrier properties. However, as casings they often do not possess the strength or size control particularly associated with fibrous casing, nor are they as capable of withstanding the physical stresses imposed by many of the stuffing and processing operations.

Many stuffing applications in fact require both the strength or size control of fibrous casing, as well as additional properties, such as moisture or oxygen barriers, not inherently possessed by that variety of casing. Prior efforts to satisfy such interfering requirements have typically been by way of attempting to attach all the desired properties to a single substrate. For example, casing lengths were coated, laminated, co-extruded, or slugged to provide the foundation casing with properties which it inherently did not possess. Merely as exemplary, and certainly not intending to be exhaustive, the following examples are offered. In Wakamatsu et al., U.S. Pat. No. 4,197,326, a laminated film is first manufactured and stretched and then formed into a tube and stuffed. The casing is said to possess both oxygen barrier properties and physical strength due to the respective laminated layers. In Lustig et al. U.S. Pat. No. 4,131,137, a base fibrous casing receives a melt-extruded thermoplastic layer for the purpose of providing barrier or other additional properties. In Underwood et al. U.S. Pat. No. 2,961,323, a cellulosic tube in its inflated state is coated with a vinylidene chloride resin followed by sintering of the coating. The cellulosic casing is intended to provide strength or like properties whereas the sintered coated layer is intended to provide barrier properties. Slugging to produce an internal barrier layer is illustrated in Gerigk et al. U.S. Pat. No. 4,192,904 and to produce an internal adhesion promoter is illustrated in Shiner et al. U.S. Pat. No. 3,378,379.

While in all cases, the properties of the resulting casing are enhanced over those of the primary casing, it is also apparent that during manufacture, the attainment of some of the properties affects the ability to retain others. That is to say, that since all of the desired properties are to be attained by a single casing article, tradeoffs are generally required in the manufacturing operations associated with that single article, which can prevent the optimization of the properties intended to be conveyed by the various constituents. Even in cases where good secondary properties can be imparted to a base casing at the manufacturing stage, it is often difficult to assure that the base casing retains those properties during casing finishing operations or actual end use of the casing.

Considering some of the examples noted above, coating or slugging are oftentimes deficient in providing the intended properties because of the difficulty in achieving or retaining sufficiently thick and uniform coating levels without discontinuities. Adhesion to the base tube can also be a problem particularly considering the punishment the casing must take during shirring when it is tightly pleated, and subsequently during stuffing when it is stretched. Taking a particular example, fibrous casing coated to achieve oxygen barrier properties, while satisfactory for many applications, is not completely satisfactory for all because the barrier is not uniform or continuous and sometimes does not adequately adhere to the fibrous casing. In the extrusion example, the extrusion process itself has its difficulties and limitations. The extruded layer does not always possess the desired thickness or uniformity and the coating overlaps the edges and detracts from appearance.

Shirring complicates some of these problems in that the casing is subjected to physical punishment in the shirring operation. High speed rolls contact a continuous casing supply, say 150 feet, in order to pleat and compact it into a shirred stick of less than 2 feet. The possibility of chipping, flaking or otherwise damaging coatings, extruded layers, or laminates attached to the base tube is apparent.

We have discovered that the tradeoffs inherent in combining competing properties in one casing can be circumvented by combining separately engineered casings; and that it is not necessary to combine all properties in a single casing before stuffing, but that a multi-walled casing can be economically formed in the stuffing operation.

Thus, it is a general aim of the present invention to provide a composite casing of enhanced overall physical properties by supplying such properties from more than one shirred source.

An object of the present invention is to combine separately manufactured and shirred casings having respective optimized physical properties in the course of a stuffing operation.

In accordance with the invention there is provided a composite casing article comprising at least two shirred casing lengths, all of the lengths having internal bores of sufficient diameter to receive a stuffing horn. The foremost length has an unshirred end of each other length passed through its bore and positioned near an unshirred end of the foremost length so that all of the unshirred ends can be brought together for joining. As a result, the composite casing article is adapted to be tandem mounted on a stuffing horn, end joined, deshirred and stuffed to form an encased product in a multi-layer composite casing.

In the preferred embodiment, the shirred casing lengths are arranged in tandem to form a composite bore of sufficient diameter to fit a stuffing horn. Typically, the casing lengths are of different materials and are of respective predetermined circumference, so constructed and arranged as to have extensibility and shrink back properties coordinated to the circumference of the product during stuffing and processing. As a result, the composite casing is in close wrinkle-free contact on the stuffed processed product. In certain applications the casing article includes sizing means implanted within the mated unshirred casing ends proximate the joined ends. Preferably, the sizing means is a sizing disk having a rim periphery greater than the unstretched circumference of the unshirred ends of both of the two casing lengths.

In accordance with a certain aspect of the invention, there is provided a casing article comprising a cellulosic shirred length of casing and a non-cellulosic shirred length of casing arranged in tandem with the cellulosic length to form a common bore of sufficient diameter to receive a stuffing horn. One of the shirred lengths has an end unshirred and passed through the bore of the other. The other shirred length has an end unshirred and mated with the unshirred end of the one and both of the mated ends are joined together for simultaneous deshirring and stuffing. The non-cellulosic casing has a property additional to those possessed by the cellulosic casing thereby to produce upon stuffing an enhanced multilayer casing.

In many instances the non-cellulosic casing length is a barrier film tube exhibiting either or both of the properties of low oxygen permeability or low moisture permeability. In certain specific applications the barrier film tube exhibits the additional property of adhesion to a product to be stuffed, and the tube is positioned to be adjacent the product when stuffed so that it can adhere thereto.

In accordance with a more limited aspect of the invention there is provided a composite shirred casing article intended to be stuffed with a food product and subsequently processed to produce a finished encased product comprising two shirred casing lengths formed of different material having different properties. The shirred casing lengths are arranged in tandem with an unshirred end of one within the bore of the other and joined to an unshirred end of the other for simultaneous deshirring upon stuffing. Both casing lengths have sufficient extensibility to be stretched to the maximum desired circumference during stuffing and processing without rupture. Both casing lengths also have sufficient shrinkability to stay in wrinklefree contact on the encased product as it contracts during processing, thereby to form a finished encased product having a composite casing, the elements of which are in intimate wrinkle-free contact on the finished encased product, and each providing its own properties to the product.

In a very specific aspect of the present invention, there is provided a composite shirred casing article intended to be stuffed with a food product and subsequently processed in preparation for consumption. The casing article comprises a fibrous shirred casing length and a film shirred casing length arranged in tandem to form a common bore of sufficient diameter to fit a stuffing horn. The film shirred casing length is rearmost and has an unshirred end within the bore of the fibrous casing length, joined to an unshirred end of the fibrous casing length for simultaneous deshirring upon stuffing. Both casing lengths have sufficient extensibility to be stretched to the maximum circumference encountered during stuffing and processing without rupture. The fibrous casing length has sufficient shrinkability to control the uniformity of the diameter of the stuffed food product and maintain the stuffed food product under pressure after stuffing and during processing. The film casing length has sufficient shrinkability to avoid wrinkling upon shrinkage of the fibrous casing length, whereby the composite shirred casing article is adapted to produce a tight unwrinkled stuffed food product.

In accordance with another aspect of the invention there is provided a method of manufacturing a stuffed food product comprising the steps of placing at least two shirred casing lengths in tandem on a stuffing horn in such a way that ends of the rearmost lengths are unshirred, passed through the bore of the foremost length and joined with an unshirred end of the foremost length. The method further includes locating the tandem sticks on the stuffing horn with the joined ends proximate the end of the stuffing horn. Finally, the method includes forcing a stuffable food product through the stuffing horn to simultaneously deshirr and stuff the resulting composite casing.

In more detail with respect to this aspect of the invention, there is provided a method of manufacturing a stuffed food product comprising the steps of providing a first shirred casing length having a characteristic property useful in a stuffing or processing operation for said food product, providing a second shirred casing length having a second characteristic property useful in a stuffing or processing operation for said food product, placing said casing lengths on a stuffing horn in tandem with an end of the rearmost length unshirred, passed through the bore of the foremost length and joined to an end of the foremost length proximate the end of the stuffing horn; stuffing a food product into the joined casings to produce a stuffed food product with a composite multi-layer casing, and balancing the circumference, extensibility and shrinkability of the respective casing lengths such that the casing layers of the composite casing remain in close wrinkle-free contact on the stuffed processed food product.

In practicing the foregoing method in certain specific aspects, it further includes providing as a first shirred casing length a fibrous shirred casing length adapted to maintain the stuffed product under pressure during stuffing and subsequent processing, and the step of providing a second shirred casing length includes providing a barrier film shirred casing length.

In certain limited aspects the invention includes providing a method of manufacturing a stuffed food product comprising the steps of placing a shirred cellulosic casing stick and a shirred film casing stick on a stuffing horn of a stuffing apparatus in tandem in such a way that an unshirred end of the film casing stick is passed through the bore of the cellulosic casing stick and closed along with an unshirred end of the cellulosic casing stick, matching the circumference, extensiblity and shrinkability of the cellulosic casing to the desired stuffed and processed circumference of the stuffed food product; matching the circumference, extensibility and shrinkability of the film casing to the desired stuffed and processed circumference of the stuffed food product so as to avoid wrinkling as the cellulosic casing maintains the food product under pressure; releasing a stuffable food product from the discharge end of the stuffing horn to simultaneously deshirr and stuff both casings, and closing the other end of the stuffed casing to form a stuffed food product having a double-layered casing.

Finally, in certain aspects of the invention it includes a method of manufacturing a composite casing article comprising the steps of providing two shirred casing lengths of different material and having different characteristics useful in a stuffing or processing operation for a food product, passing an unshirred end of one casing length through a bore of the other casing length for joining with an unshirred end of said other casing length, and arranging said casing lengths in tandem to form a common bore of sufficient diameter to receive a stuffing horn.

Other objects and advantages will become apparent from the following detailed description taken in conjunction with the drawings in which.

While the invention will be described in connection with certain preferred embodiments, there is no intent to limit it to those embodiments. On the contrary, the intent is to cover all alternatives, modifications and equivalents of the illustrated embodiments encompassed by the appended claims.

Figures 1, 2:
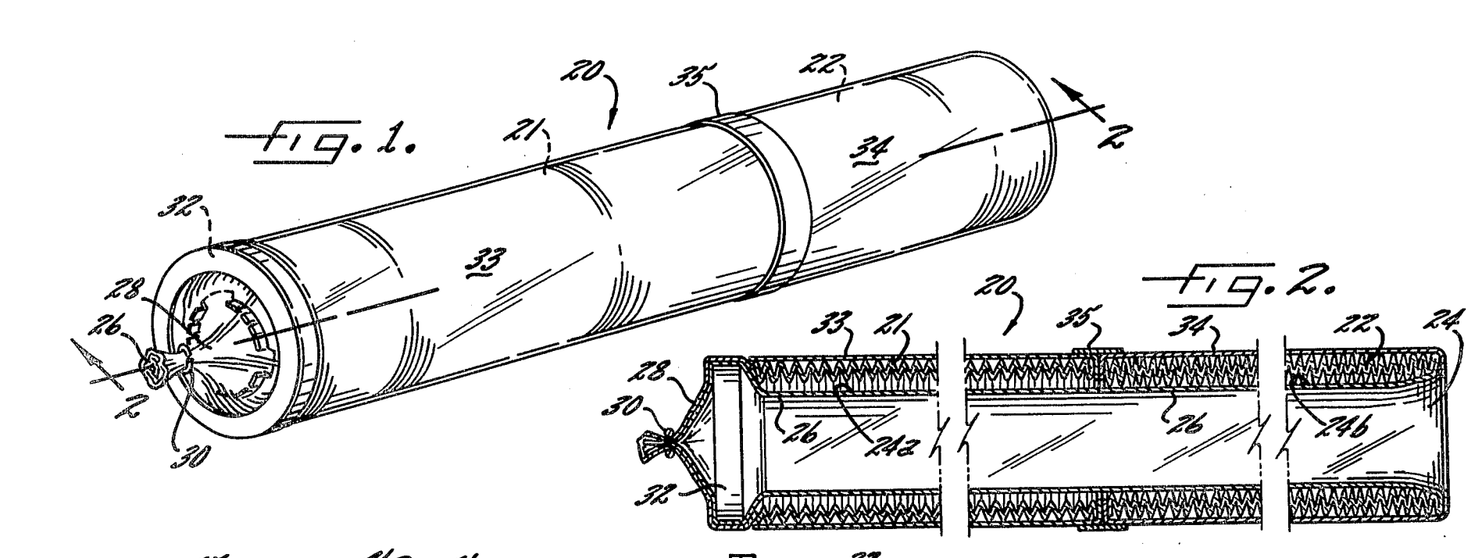
FIG. 1 is a perspective view showing a shirred casing article exemplifying the present invention.
FIG. 2 is a sectional view taken along the line 2—2 of FIG. 1.

Turning now to the drawings, FIGS. 1 and 2 show a shirred casing article 20 comprising shirred casing lengths 21, 22 (commonly known as shirred casing sticks), arranged in tandem to form a common bore 24 of sufficient diameter to fit a stuffing horn of a stuffing apparatus. The shirred casing lengths 21, 22 are of different casing material intended to lend their respective properties to an encased product. The rearmost stick has an end 26 unshirred and passed through the bore 24a of the foremost stick 21. In the illustrated embodiment, the rear stick 22 also has its unshirred end 26 passed through its own bore 24b such that the casing is inverted, i.e., turned inside out, by deshirring. The unshirred end 26 is arranged proximate an unshirred end 28 of the foremost stick 21 such that both ends are easily joined to form a unitary closed end for common deshirring while stuffing. In the preferred embodiment, the ends are joined and closed by a clip 30, although equivalent closures known to the art, such as caps, can be used.

In the embodiment illustrated in FIGS. 1 and 2, the casing article 20 includes an implanted sizing disc 32 as described in Beckman U.S. Pat. No. 4,007,761 and Kupcikevicius et al. U.S. Pat. No. Re. 30,265. As such, the illustrated article is adapted for use on the stuffing apparatus described in Kupcikevicius et al. U.S. Pat. No. Re. 30,390. While that embodiment of the stuffing apparatus is preferred due to the superior size control achieved thereby, it is also clear that the invention described and claimed herein is usable with many other forms of stuffing and sizing apparatus.

For the purpose of protecting and maintaining the structural integrity of the shirred sticks 21, 22, protective overwraps 33, 34 cover the exterior of the shirred sticks 21, 22 leaving the internal bores 24a, 24b free to receive a stuffing horn of a stuffing apparatus. When separate overwraps 33, 34 are used, they can be applied to the respective shirred sections 21, 22 immediately after shirring. Conveniently, when the sticks are combined and arranged in tandem, means are provided for joining the overwraps 33, 34, such means being shown herein as a strip of tape 35 applied at the junction of the overwraps. As an equivalent construction, it may be desirable in some circumstances to apply a single overwrap to the tandem sticks after they are combined. Preferably the overwrap is an elastic film, although netting or other equivalents are also usable.

It is presently contemplated in the preferred practice of the invention to provide a prepackaged casing article having the sticks 21, 22 in tandem to form a common aligned bore. It may, however, prove desirable in certain circumstances for the casing manufacturer to ship the article constructed in accordance with the present invention with the stick elements 21, 22 in side by side rather than tandem relationship. In such a case, the rearmost casing stick has an end unshirred and passed through the bore of the foremost stick and disposed near an unshirred end of the foremost stick for joining thereto. The so-combined stick elements, rather than being arranged in tandem, are then placed in side by side relationship in the shipping carton with the unshirred end of the rearmost stick within the bore of the foremost stick. At the packing house, the stuffing machine operator simply removes the joined casing sticks from the carton and places them in tandem on the stuffing horn.

Two methods can be used for manufacture of a casing article according to the present invention. The first and preferred method involves manufacture of the combined article by the casing manufacturer who is responsible for coordinating the properties of the respective casing elements (and sizing elements if present) to each other and to the requirements of the finished product. In practicing that method, the casing manufacturer provides two shirred casing sticks 21, 22, the sticks being made of different material and having different characteristics useful in a stuffing or processing operation. As will be described in greater detail below, the dimension-related characteristics of the sticks are coordinated to each other and to the requirements of the stuffed food product. An unshirred end of one of the sticks 22 is passed through the bore 24a of the other stick 21 for joining with an unshirred end of the other stick 21. That operation can conveniently be performed on a mandrel having a length and diameter compatible with the casing article being manufactured.

For articles using a sizing disc 32, after the end of the rearmost stick 22 is passed through the bore 24a of the foremost stick 21, the disc is inserted into the combined ends such that both unshirred ends pass over the disc. Preferably the joined ends are then closed, such as by means of a clip 30. It is preferable, although not necessary, to keep the sticks in tandem for shipment, and in that situation, it is desirable to join the overwraps of the respective stick element by means of splice 35.

The second method of manufacture is capable of achieving only some of the advantages of the invention, but is useful where the packing house wishes to exercise direct control of the elements of the combined casing stick. The method contemplates assembly of the combined casing article on the stuffing horn of a stuffing apparatus. As such, the user can achieve the product related advantages of the invention while foregoing some of the benefits of the preferred embodiment in simplifying and facilitating its use. In carrying out this second method of manufacturing the casing article, the packing house operator places a first shirred stick of casing on the stuffing horn, pushing it well back to the base of the horn. An end of that casing stick is unshirred so that it can be passed through the bore of a second casing stick. To facilitate that operation, the operator can use the clipping device of the stuffing machine to clp the end of the first stick so that the stuffing horn itself holds the clipped end extended. The second shirred casing stick is then placed on the stuffing horn over the unshirred end of the first stick. An unshirred end of the second casing stick is joined with the unshirred end of the first, and the so-joined ends are clipped together. If the second clip is applied to the rear of the first, the operator can then sever the casing tail to remove the first applied clip.

The details of the other operations performed in manufacturing the casing article, such as compacting or shirring the respective stick elements, lubricating or premoisturizing the casing during shirring, overwrapping the elements or the combined article are all known to those skilled in this art and will not be further described. It is noted, however, that lubrication such as mineral oil normally applied in the shirring operation also serves a function in deshirring by reducing friction between the combined casing elements and the sizing disc. Typically, the casing elements will be of different unstretched circumference such that they have different motions with respect to each other as they are sized and stuffed out. Thus, for many casing types it is desirable to increase the amount of lubricant over that normally applied in order to reduce friction to acceptable levels for deshirring and stuffing. A quantity of 0.3 cc/100 square inches of mineral oil has been found to be suitable for most casing types. It is also pointed out that high liquid lubricant levels are desirable in the combined casing article of the present invention where the exterior layer is an oxygen barrier, because the liquid lubricant can form an effective seal at the sizing disc during deshirring so as to prevent the entrapment of air between the casing layers during stuffing.

Figure 3:
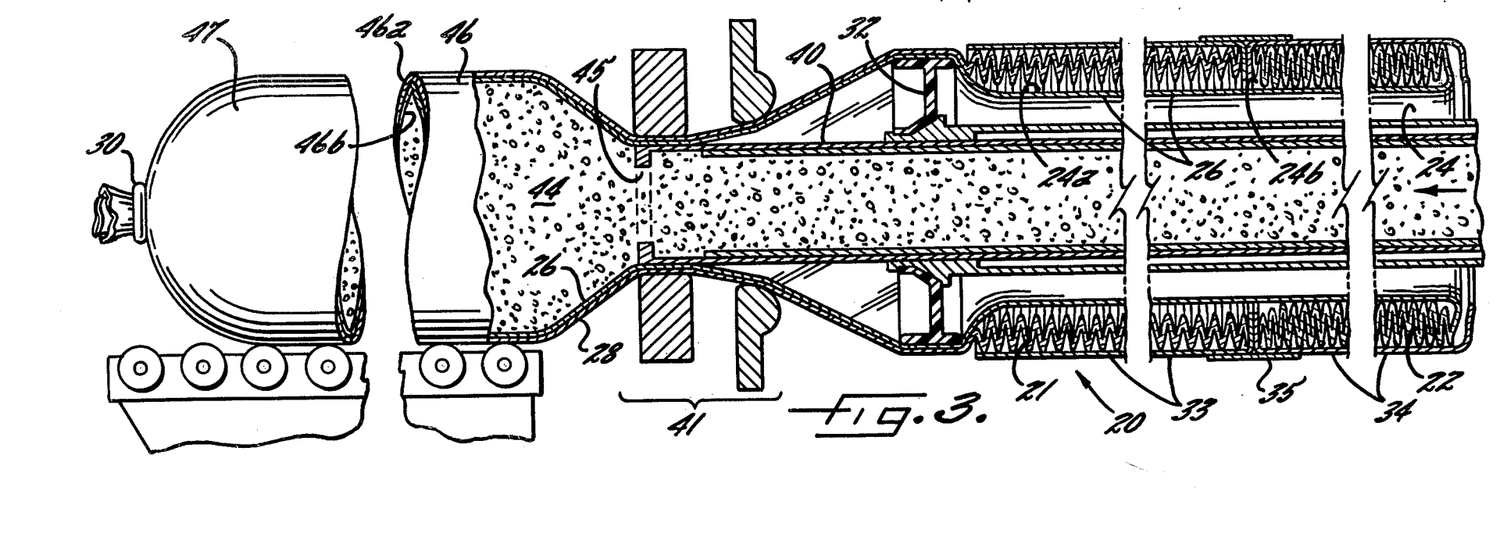
FIG. 3 is a fragmentary view showing a portion of a stuffing apparatus associated with a casing article exemplifying the present invention.

Turning now to FIG. 3, there is shown a shirred casing article 20 of the type illustrated in FIGS. 1 and 2 being stuffed to form an encased food product. A pair of shirred casing lengths 21, 22 are arranged in tandem on a stuffing horn 40 of a stuffing apparatus, a portion of which is schematically illustrated at 41. Since an understanding of the particular stuffing apparatus is not required for an appreciation of the present invention, the reader is referred to the aforementioned U.S. Reissue No. 30,390 and also Frey et al. U.S. Pat. No. 4,077,090 if additional information is desired on the stuffing apparatus.

In the illustrated embodiment, an unshirred end 26 of the rearmost stick 22 is passed through the bore 24a of the foremost stick and arranged proximate an unshirred end 28 thereof. Prior to the stage illustrated in FIG. 3, the unshirred ends had been passed over the sizing disc 32 and clipped to form a unitary casing end.

As shown in FIG. 3, a stuffable food product 44 is being released from the discharge end 45 of the stuffing horn 40 causing the filling of the composite casing 46. The casing is deshirred over the sizing disc 32 and when filed with the food product 44 expands to a predetermined circumference. Typically, when the food product 47 is stuffed to the desired length, a rear clip similar to clip 30 is applied and the casing is severed to form an encased food product ready for subsequent processing. A clip applied to the unfilled end of the composite casing article forms a unitary closed end for stuffing a subsequent product 47.

The stuffed food product 47 is encased in a double walled casing 46a, 46b, which composite casing was formed during the stuffing operation from the elements 21, 22 of the casing article 20. As noted above, the materials from which the elements 21, 22 are made are different, each being designed for particular properties to be provided to the encased product 47. Thus, the composite casing 46 has characteristics arising from the combination of the characteristics of the elements 21, 22 and these characteristics are combined in a way superior to prior attempts to achieve additional characteristics by coating, laminating, or the like.

More specifically, in practicing the present invention, the manufacturing operations for one of the elements, for example shirred length 21, are not complicated by the manufacturing operations for its intended partner element 22 because they are performed independently of each other. By way of contrast, in prior techniques which relied on coating, laminating, extruding or the like, the multiple manufacturing operations were all performed on the same base, oftentimes requiring tradeoffs in achieving the desired characteristics such that the composite manufactured article which resulted from the final step was often deficient in providing one or more of the desired properties. For example, if a fibrous casing is coated with some form of barrier layer, the coating limits the ability of the fibrous casing to stretch and shrink without damaging the coating, while the fibrous casing characteristics and the end use requirements set limits on the coating properties. Thus, even if the coating is reasonably continuous when applied, in many cases it is likely that subsequent activities, such as the stretching encountered during stuffing will create discontinuities.

According to the present invention, however, the manufacturing operations for the casing length 21 can be performed quite independently of any requirement for the casing length 22, allowing the end use characteristics of each to be optimized without complication arising from the other. The individually manufactured shirred casing lengths are then merged in the stuffing operation by simultaneously deshirring and stuffing two or more of the elements mounted in tandem on a stuffing horn to produce an encased product with a tight, wrinkle-free composite casing. Each of the casing lengths lends its improved characteristic to the final encased product 47, resulting in a composite casing 46 having characteristics superior to those achievable heretofore.

While some of the characteristics of the respective casing lengths 21, 22 are designed to be compatible with particular stuffing, processing or storage requirements, additional characteristics must be matched so that the composite casing article 46 remains in tight wrinkle-free contact on the encased food product. Before describing those characteristics in particular exemplary embodiments, it will be worthwhile to review some of those parameters. While there is certainly some overlap, it is convenient to think of the properties of the casing elements 21, 22 as divided into two main classes, namely, dimension-related and product-related parameters.

The dimension-related parameters (those related to dimension and dimension change) are intended to produce a wrinkle-free product, and encompass the properties of the casing elements 21, 22, which must be matched or coordinated in order to attain that goal. Such parameters include circumference, extensibility, and shrinkability or shrinkback. Circumference is some measure of the basic size of the casing element, be it terms of actual circumference, flat width of a film tube or catalog size designation for fibrous casing. Extensibility is the ability of a casing to stretch beyond its initial size without rupture, as required during the stuffing and processing operation. Shrinkability or shrinkback is a general term which implies contraction of the casing during some portion of the process. The term is intended to encompass one or more of the properties of elastic recovery, heat shrinkability and syneresis. Elastic recovery is the ability of a casing when stretched to return to or toward its unstretched size, and it is relied on in sausage manufacturing to produce a compressive force on the encased meat mass. Heat shrinkability is the ability of certain polymeric films to contract when subjected to heat. Heat shrinkability obviously includes the ability to contract to a circumference smaller than the unstretched circumference. Syneresis is sometimes used in the casing art to describe the tendency of the casing to contract as it dries. This not only includes the ability to return from a stretched to an original circumference, but also the ability to contract to a smaller circumference as additional water is removed.

Product-related parameters are numerous and depend upon the requirements of a particular end product and the process to which it is subjected. These are the characteristics which the respective elements 21, 22 of the composite casing article 20 are especially configured to achieve. For example, when one of the casing elements is a fibrous casing, the characteristics normally expected are reasonable strength and toughness, size control, and tear resistence. Film casing can be formulated to achieve other desired properties including barrier properties. For example, vinylidene chloride copolymer films can be formulated to cause the film to serve as an oxygen barrier, a moisture barrier or both. When reference is made herein to barrier properties or low permeability, what is intended is less than about 8 cc/100 in$^2$/24 hrs/atm (as measured by ASTM test D-3985-81) in the case of oxygen or 17 gm/100 in$^2$/24 hrs (as measured by ASTM test 96–66) in the case of moisture. Other films such as polyester can be configured to serve not only as a moisture barrier, but also to provide reasonable strength and toughness when utilized as an external layer on a stuffed product. Biaxially stretched vinylidene chloride copolymer films can be produced with reasonable heat shrinkability.

In order to fully disclose the invention, before describing specific embodiments demonstrating the practice of the present invention in particular circumstances, the underlying considerations which govern such practice will be discussed. The productrelated properties of the respective casing components are determined to suit the requirements of a particular end use. In the majority of applications investigated to date, the properties of one casing component are primarily related to the stuffing operation and the properties of the second are primarily related to processing or storage requirements. Most commonly, the first casing component will be a fibrous casing and the second casing component a film having characteristics to suit the particular end use requirements. In that situation, the characteristics of the fibrous casing are determined in large part by the required stuffed diameter of the sausage product, and may include conventional treatments (such as for peelability or adhesion) as required by the nature of the product.

The dimension-related characteristics of the associated film casing must be related to those of the fibrous casing in order to produce a stuffed processed product with a tight wrinkle-free composite casing. Thus, the circumference or flat width of the film casing must be related to the circumference of the fibrous casing such that they are compatible in the stuffing and processing operations. The film casing must have sufficient extensibility to tolerate stretching during stuffing and subsequent processing, and must have sufficient shrinkability (if the product shrinks during processing) to remain wrinkle-free. With certain vinylidene chloride copolymer films, in order to get sufficient shrinkability to remain wrinkle-free on the product, it is not uncommon to select an initial circumference which will cause approximately a ten percent stretch during the stuffing operation and another four or five percent stretch in the processing operation, before shrinkage of the product with composite casing back to approximately its original stuffed diameter.

The relative location of the casing layers is also suited to the requirements of the product, as will become apparent from a consideration of the exemplary embodiments. Generally if a moisture barrier is disposed outside a fibrous layer, the composite casing will have sufficient extensibility to stretch during stuffing and cooking, but shrinkback will be limited primarily to recoverable elasticity, such that the casing will not shrink significantly below the stuffed green diameter. If it is desired to utilize the syneresis properties of the fibrous casing to shrink below the green stuffed diameter, the casing layers should be arranged with no moisture barrier outside the fibrous. Similarly, if it is desired to protect the fibrous casing from extreme moisture loss during operations such as blast freezing, a moisture barrier layer should be disposed outside the fibrous layer.

Before turning to the specific embodiments, it will be noted that terms used herein which are not central to the practice of the invention are intended to have their broadest scope consonant with the invention. For example, the casing article is referred to as being shirred, which is currently the most common and popular form of compacted pleated casing. However, the term is intended to encompass fully equivalent compacted casing elements, such as those compacted by the winding process described in McNeill U.S. Pat. No. 3,709,703. In that same regard, the end of the casing is often referred to as unshirred to indicate that it is unimportant whether the end was once shirred then deshirred, or was never shirred in the first instance.

The product to be stuffed into the casing is obviously important in determining the end use requirements for a particular application, but is unimportant in considering the invention broadly. Most often the product is a meat emulsion, but it can be ground or chopped meat, or in some instances, whole muscle boned hams. The term stuffable food product is intended to encompass all of such products (as well as non-meat protein products or cheeses) so as to describe any product capable of being forced through a stuffing horn into a casing.

The term processing may have various meanings in particular packing houses. When used in this specification, it is intended to encompass all operations occurring in a packing house subsequent to stuffing and before shipping.

With that in mind, particular embodiments of the invention will be described in order to demonstrate how the aforementioned principles of this invention are applied in particular end use situations.

LIVER SAUSAGE

The production of liver sausage is one important area of application for casing articles according to the present invention. While there are many recipes and many processes, a typical process will be described in order to illustrate the practice of the invention.

Liver sausage meat emulsion is forced by means of a food pump through the horn of a stuffing apparatus such as a SHIRMATIC F Sizer or a POLYCLIP FCA or FCAS. A shirred casing article previously placed on the horn and having its first end clip closed is filled by the emulsion until a predetermined length is reached, whereupon a valve or other such means interrupts the emulsion flow. The second end is clipped closed, the product is severed, a clip applied to the free end of the remaining shirred casing stick and the process repeated. During the stuffing operation, the casing is generally stretched by a predetermined amount beyond its unstretched circumference to a stuffed green circumference recommended by the casing manufacturer.

The stuffed food product is then cooked, cooled and stored. Cooking can be accomplished in a number of ways, but many modern highly efficient processes involve water cooking. For example, using a Jourdan cooker, the product can be immersed in a water bath at about 165° F. until the internal temperature reaches 152° to 155° F. The casing must function as a moisture barrier in order to prevent product discoloration which could be caused by the water bath. During cooking, the product expands, growths of 4 or 5% not being uncommon. The casing must have sufficient extensibility to allow such expansion without rupture.

Following cooking the product is cooled. It is not uncommon to shower the product with water at about 40° F. for a period of about 30 minutes. This operation causes the product to shrink. The casing must have sufficient recoverable elasticity to maintain the meat mass under pressure so as to prevent fat from rendering and collecting at the periphery of the sausage beneath the casing, and also to prevent the casing from wrinkling. Finally, liver sausage is susceptible to discoloration caused by contact with oxygen. Accordingly, the casing must serve as an oxygen barrier in order to provide adequate shelf life.

Because fibrous casing has good strength, size control and shrinkback properties, certain liver sausage products stuffed in artificial casing have employed fibrous casing treated or coated to provide the necessary moisture and oxygen barrier properties. Examples are externally coated barrier casing such as MP sold by Union Carbide Corporation and CMVP sold by Teepak, Inc., and internally coated barrier casing such as Walsroder F plus. These commercially available barrier-coated fibrous casing products are generally manufactured by taking a conventional fibrous casing and depositing a coating from an aqueous or solvent vehicle system. When the vehicle is driven off, the casing is left with a coated layer providing the barrier properties. While such casing is suitable for many applications, it is not entirely satisfactory in providing the desired barrier properties for liver sausage. Even in cases where a reasonably continuous barrier layer is applied during manufacture, it is found that discontinuities in the barrier develop as the fibrous casing stretches and shrinks in the manner described above.

Figure 4:
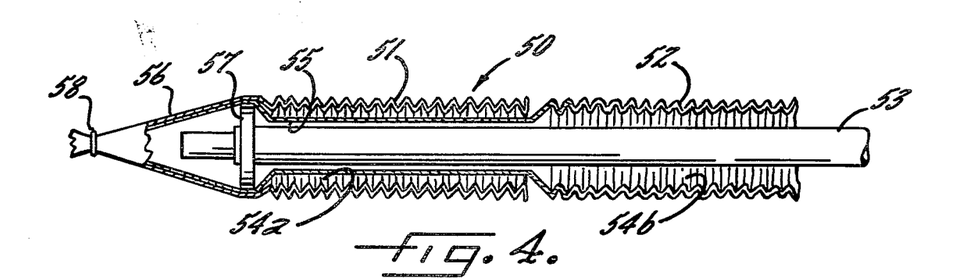
FIGS. 4–7 are schematic views illustrating representative configurations of casing articles according to the present invention.
Figure 5:
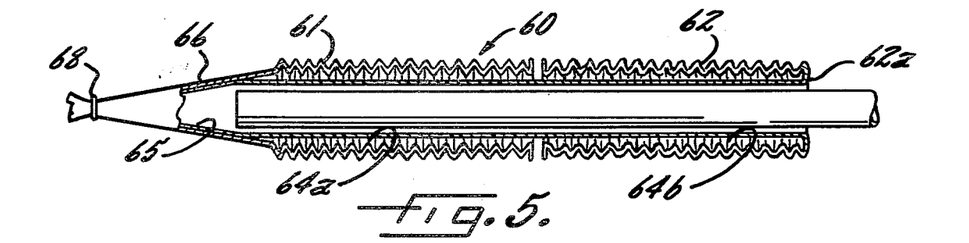
Figure 6:
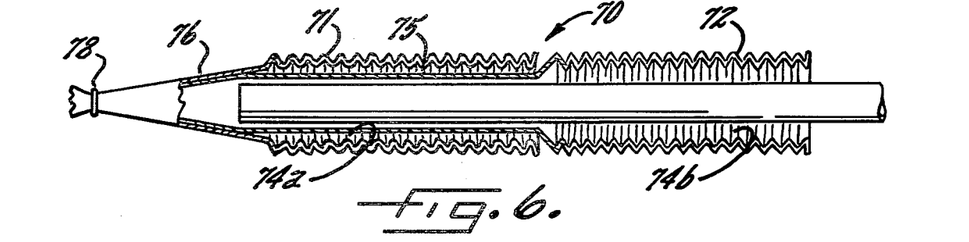
Figure 7:
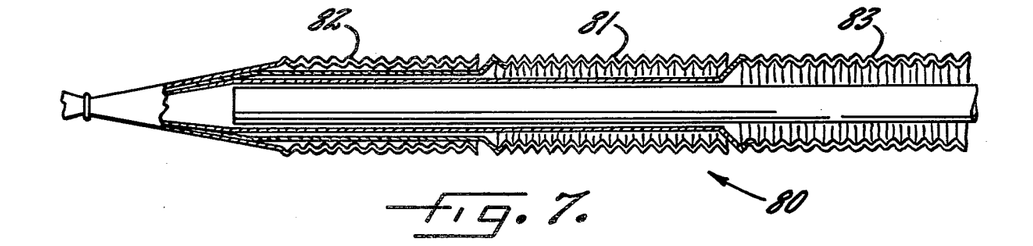

In accordance with the invention, a composite casing article is provided having barrier properties unattainable by available coated fibrous barrier casing products. FIG. 4 illustrates such a composite casing article 50 comprising a pair of shirred casing lengths 51, 52 arranged in tandem on a stuffing horn 53 to form a common bore 54. It is noted that FIG. 4, as well as FIGS. 5–7 are simplified in that overwraps and the like are not shown. The rearmost casing length 52 (the stick farthest from the discharge end of the stuffing horn) has an unshirred end 55 passed through the bore 54a of the foremost casing length (the stick nearest the discharge end of the stuffing horn). An unshirred end 56 of the foremost stick 51 is mated with the unshirred end 55. In the illustrated embodiment, a sizing disc 57 is implanted within the casing article, the ends 55, 56 being stretched over the disc 57 and joined by means of a clip 58.

The foremost casing length 51 is a shirred stick of regular fibrous casing of appropriate size for the particular stuffing application. For example, size 4 regular fibrous casing of Union Carbide Corporation can be used, which has an average flat width of about 4.44 inches and a recommended stuffed diameter of 3.26 inches.

The rearmost stick 52 is configured to provide both a moisture and oxygen barrier, and is preferably a copolymer of vinylidene chloride with some other monomer, such as vinyl chloride. In a practical embodiment of the invention (for use with the aforementioned size 4 regular fibrous casing), a copolymer formulation of the type set out in Table 1 was extruded to produce a biaxially stretched vinylidene chloride copolymer film tube having the physical characteristics set out in Table 2:

TABLE 1

| Vinylidene Chloride Copolymer Blended Formulation | |
|---|---|
| Kureha "F" Resin | 100 parts |
| Dibutyl Sebacate | 5.5 parts |
| Hystrene 9718 Stearic Acid | 0.2 parts |
| Silicon Dioxide | 0.7 parts |

TABLE 2

| Vinylidene Chloride Copolymer Film Physical Characteristics | |
|---|---|
| Flat width (inches) | 4.5 |
| Thickness (mils) | 1.2 |
| Secant modulus, M.D., room temp. (psi) | 29,600 |
| 30° F. | 69,500 |
| Tear strength, MD (g/mil) | 54 |
| (Elmendorf Tear), TD | 56 |
| Tensile strength, MD (psi) | 9,400 |
| TD | 16,000 |
| % Elongation, MD | 75 |
| % Elongation, TD | 70 |
| % Shrink at 80° C., MD | 20 |
| % Shrink at 80° C., TD | 20 |
| Recoverable elasticity, room temp. | |
| after 11% stretch, MD | 86% |
| TD | 88% |
| after 21% stretch, MD | 82% |
| TD | 78% |
| Oxygen transmission (cc/100 in$^2$/24 hrs/atm) | 4.1 |
| Moisture vapor transmission (g/100 in$^2$/24 hrs) | 1.4 |

[MD is machine direction and TD is transverse direction.]

The physical characteristics of the vinylidene chloride copolymer tube allow it to expand along with the fibrous casing to the recommended stuffed green diameter of 3.26 inches. In addition, the film tube has sufficient extensibility to stretch as the meat mass swells during the cooking portion of the processing operation. During cooling, when the meat mass shrinks and the recoverable elasticity of the fibrous casing causes it to shrink, the vinylidene chloride copolymer film tube also has sufficient shrinkability to keep the composite casing wrinkle-free on the encased meat mass.

It is seen that the preferred vinylidene chloride copolymer film tube is 1.2 mils in thickness, and has low oxygen and moisture transmission coefficients to provide a continuous moisture and oxygen barrier over the meat mass. This is to be contrasted with the comparatively thin and discontinuous barrier layer achieved on the stuffed product when using a coated fibrous casing. Typically, such a barrier layer is on the order of 0.25 mils or less, but more importantly has microscopic defects resulting from the coating process as well as additional defects subsequently induced by shirring or stuffing, all detrimental to the desired barrier.

Superior barrier properties have been demonstrated using liver sausage emulsion with substantially reduced cure levels to accentuate barrier deficiencies. Products were stuffed in the FIG. 4 tandem combination casing and in the aforementioned conventional MP fibrous casing, then processed as described above. After 15 days of storage the conventional casing allowed light to moderate discoloration of the meat mass and a weight loss of 1.2% whereas using the FIG. 4 article there was no disoloration or weight loss. After seven weeks of storage, the product stuffed in the conventional casing had heavy discoloration and some evident dehydration, whereas the product encased in the FIG. 4 composite casing still had no discoloration or measurable weight loss. At the seven week stage, the FIG. 4 encased product remained plump and attractive whereas wrinkling was apparent on the conventionally encased product.

The internal moisture barrier of the FIG. 4 embodiment is also of value in enhancing the appearance of the encased food product. More particularly, it is possible using an external barrier casing, for meat juices and the like to saturate the fibrous casing during processing, causing a measure of discoloration. However, with the internal moisture barrier provided by the casing element 52, the fibrous casing 51 is protected from meat juices, producing an encased food product with a clean uniform appearance.

FLEISCHWURST

This is primarily a European product, but the composite casing type is also useful for domestic sausage applications which require a moisture barrier for water cooking and which use a stuffed product susceptible to emulsion breakdown commonly referred to as fat-out or rendering. As such, the casing article according to the invention is also usable with, for example, liver sausage emulsions having relatively high fat content.

Although the typical fleischwurst recipe produces a chopped and mixed product rather than an emulsion, the stuffed product can be processed much like the liver sausage described above. Thus it requires a moisture barrier to prevent the discoloration which would otherwise be caused by water bath cooking. In addition, a small but significant proportion of the market requires an oxygen and moisture barrier to meet expected shelf life demands.

Typical fleischwurst recipes have a relatively high fat content and, as such, are subject to fat-out. It is well known that if the casing is caused to adhere to the meat mass, there is no space for jelly pockets to form and, accordingly, the fat-out problem is alleviated. With some fleischwurst recipes, a simple adhesion promoter on the internal surface of the casing is adequate to produce an acceptable product. Other formulations, however, higher in fat content, tend to form liquid or gelatin at the end caps during cooking, even when an adhesion promoter is applied to the internal casing surface. In those cases, it is necessary to "stick" the product, that is punch small holes in the casing at the end caps. In order to expel the fluid after sticking and still retain a tight plump product appearance, the casing must be capable of shrinking below its stuffed green diameter.

A typical prior art approach for fleischwurst casing was use of an internal barrier coated fibrous casing, such as those identified in connection with the liver sausage application, arranged with the barrier in contact with the meat mass, and having an adhesion promoter on the barrier surface. The adhesion promoter is intended to limit the accumulation of liquids, if any, to the ends of the product. The internal barrier allows exposure of the fibrous base layer to the air, bringing syneresis into play to contract the casing below its stuffed green diameter, expelling the liquid. However, the barrier properties are no better than those described in connection with the liver sausage application.

FIG. 5 illustrates a casing article 60 constructed in accordance with the present invention capable of satisfying fleischwurst requirements in a manner superior to that achieved heretofore. As in the case of the liver sausage casing article 50, the foremost stick 61 of the article 60 is a fibrous casing length, such as regular size 4 fibrous. The rear casing length 62 is a biaxially stretched vinylidene chloride copolymer film of the formulation shown in Table 1 and having the physical characteristics shown in Table 2. Prior to shirring, however, the film tube has its exterior surface coated with a polyvinylidene chloride resin in latex form, preferably Daran 220 sold by W.R. Grace & Company. The latex is applied so as to form a thin, dry layer of Daran 220 resin approximately 0.1 mils in thickness on the exterior of the film tube, the function of which is to promote adhesion to the meat mass. In order to get the treated surface in contact with the meat, the rear casing length 62 is deshirred through its own bore. As shown in FIG. 5, the aft end 62a of the stick 62 is deshirred, passed through its own bore 64b, then through the bore 64a of the foremost stick and arranged proximate an unshirred end 66 thereof. The unshirred ends 65, 66 of the respective casing lengths are joined such as by means of a clip 68. FIG. 5 illustrates the use of the combined casing article without the sizing disc, a condition which would be encountered when using such an article on machines such as the POLYCLIP FCAS stuffer.

The respective casing layers have sufficient extensibility to stretch from the stuffed green diameter by an amount, typically 1-2%, required by expansion of the meat mass during the cooking operation. The barrier properties provided by the film layer are more than adequate to protect the meat mass from the cooking water. Furthermore, the adhesion promotion layer on the film surface causes the film to adhere to the meat mass, preventing the accumulation of liquid at the interface of the sausage and the casing. The elastic recovery properties of the film and fibrous casing are coordinated such that, as the product shrinks during cooling, both casing layers also shrink to keep the composite casing tight and wrinkle-free. If juices collect at the product ends, the product can be stuck, and the regular fibrous layer, external to the film casing and exposed to the air, can contract by means of syneresis to expel the juices and remain tight on the sausage. The film casing layer has sufficient recoverable elasticity to shrink along with the fibrous layer to keep the casing in tight wrinkle-free contact with the encased meat mass. Finally, the film casing layer has excellent barrier properties, producing a sausage product which is not only attractive in appearance but also has extended shelf life.

BLAST FROZEN PRODUCTS

Typical products in this category are beef rolls and turkey rolls sold frozen for institutional use. The stuffed food product can be in emulsion or chunk form. Some of the products are cooked before freezing and shipment; others are frozen directly after stuffing. A common characteristic is the freezing of the product at the packing house. The institutional user, such as a hospital or cafeteria, completes the cooking of the product and slices it for consumption.

In the case where the product is cooked at the packing house, it is often cooked for four or five hours in a water bath at temperatures which can approach the boiling point. A moisture barrier is needed to protect the encased meat mass in this operation. Following cooking and cooling of the cooked product, or stuffing of the uncooked product, the product is blast frozen at temperatures as low as −70° F. It is not unusual to store the product for a year or more requiring a casing with very good moisture barrier properties to prevent dehydration during frozen storage. In these applications, by the time the product gets into the freezer, the fibrous casing is generally excessively dehydrated, limiting its capacity to expand to accommodate the expansion of the product due to freezing. The result is splitting of the fibrous casing. An external moisture barrier is required to protect the fibrous casing from this failure mode.

Two types of prior art casing are currently used for this blast frozen product. The first is the external barrier coated fibrous casing, such as aforementioned MP fibrous casing. Using this type of casing, local imperfections in the barrier-coated layer give rise to localized freezer burn in the end product. A second approach is use of plastic films which, however, often produce a product of non-uniform shape. In addition, many of the plastic films do not have sufficient recoverable elasticity such that they must be reclipped after cooking in order to tighten the casing before freezing.

In accordance with the invention, a composite casing article is provided having a fibrous casing for controlling size of the stuffed product and a moisture barrier external thereto for protecting the fibrous casing and encased meat mass from the freezing operation. FIG. 6 illustrates the article 70 particularly adapted for the class of products which are frozen without prior cooking. The foremost casing length 71 is a film casing having moisture barrier properties and also sufficient toughness to withstand the clipping operation as well as the subsequent freezing operation. A currently preferred film is a polyester having the physical characteristics set out in Table 3:

TABLE 3

| Polyester Physical Properties | |
|---|---|
| Flat width (inches) | 4.65 |
| Thickness (mil) | 1.12 |
| Force to Stretch (lbs.) 11%, MD | 12.9 |
| Force to Stretch (lbs.) 11%, TD | 23.0 |
| 21%, MD | 12.8 |
| Force to Stretch (lbs.) 21%, TD | 28.5 |
| Recoverable elasticity (%) at 11% stretch, MD | 54 |
| Recoverable elasticity (%) at 11% stretch, TD | 46 |
| at 21% stretch, MD | 27 |
| Recoverable elasticity (%) at 21% stretch, TD | 22 |
| Heat Shrink, %, at 63° C., MD | 2 |
| Heat Shrink, %, at 63° C., TD | 6 |
| at 74° C., MD | 13 |
| Heat Shrink, % at 74° C., TD | 8 |
| Tear test, (g), MD | 44 |
| (Thwing-Albert tester), TD | 21 |
| Stretch to Break, (%), MD | 230 |
| Stretch to Break, (%), TD | 90 |
| Force to Break, (lbs.), MD | 24.4 |
| Force to Break, (lbs.), TD | 38 |
| Oxygen transmission rate cc/100 in$^2$/atm/24 hrs | 5 |
| Moisture transmission rate | 2 |

TABLE 3-continued

| Polyester Physical Properties | |
|---|---|
| g/100 in²/24 hrs | |

It is seen that the film tube has sufficient extensibility to tolerate the stuffing operation as well as expansion of the encased product during the freezing operation. While the recoverable elasticity is comparatively low as compared to the vinylidene chloride copolymer films discussed above, the stuffing flash freezing operation does not contemplate shrinkage of the product, such that recoverable elasticity is not an important characteristic. However, the film does have good physical toughness, requires substantial force to break, and has the necessary moisture barrier properties.

The rearmost casing length 72 of the article 70 is a cellulosic casing length, in this example regular size 4 fibrous casing. The characteristics of such casing are compatible with the flat width and dimension related characteristics of the polyester film 71. If desired, the surface of the fibrous casing which will contact the meat mass can be treated with one of the compositions known to the art for enhancing peelability.

Due to its lack of defects, the composite casing 70 consistently provides the stuffed product a far superior moisture barrier as compared to the conventional MP fibrous casing used heretofore. The localized freezer burn resulting from small imperfections in the barrier is eliminated. The inclusion of the fibrous casing length 72 in the composite article assures good size control in comparison with prior art plastic casing.

FIG. 7 illustrates a casing article 80 according to the invention adapted for use in operations which cook the stuffed product before blast freezing. In this case not only is there provided a cellulosic casing length 81 for controlling size of the product, and a moisture barrier casing length 82 external to the cellulosic casing for protecting the cellulosic casing length from excessive moisture loss, but there is also provided a further barrier casing 83 internal to the fibrous casing for preventing the accumulation of moisture and juices between the casing and the encased meat mass. In the article 80 the cellulosic casing length 81 can again be a size 4 regular fibrous casing intended to be stuffed to a recommended diameter of 3.26 inches. The moisture barrier casing length 82 is preferably an ethylene acrylic acid copolymer (18% acrylic acid) having the physical characteristics set out in Table 4:

TABLE 4

| Ethylene Acrylic Acid Physical Properties | |
|---|---|
| Flat width, inches | 4.5 |
| Thickness, mils | 1.89 |
| Secant modulus, room temp, MD | 15,860 |
| (psi) | 15,850 |
| Tear strength at 25° C., MD | 152 |
| (g/mil) | 158 |
| Oxygen transmission | 414 |
| (cc/100 in²/24 hr/atm) | |
| Moisture vapor transmission | 1.31 |
| (g/100 in²/24 hr) | |
| % Elongation, MD | 520% |
| % Elongation, TD | 580% |
| Recoverable elasticity | |
| after 11% stretch, MD | 90% |
| after 11% stretch, TD | 88% |
| after 21% stretch, MD | 86% |
| after 21% stretch, TD | 84% |
| % Shrink | |
| at 63° C., MD | 0 |

TABLE 4-continued

| Ethylene Acrylic Acid Physical Properties | |
|---|---|
| at 63° C., TD | 2% |
| at 85° C., MD | 0 |
| at 85° C., TD | 4% |

It is seen from the physical characteristics that the casing length 82 not only is sufficiently tough to withstand the physical abuse of the process, but it has sufficient recoverable elasticity to contract with the meat product and the other casing layers when the cooked product begins to shrink. Additionally, it has a very low moisture vapor transmission rate so as to provide adequate protection to the cellulosic casing length 81 which it overlies.

The film casing length 83 is preferably a biaxially stretched vinylidene chloride copolymer film, the formulation of which is set out in Table 1 and the physical characteristics of which are set out in Table 2.

Stuffing of the three layer composite article 80 produces a casing having a moisture barrier on the outside protecting the intermediate cellulosic layer 81. The cellulosic layer controls size of the stuffed product while the moisture barrier 82 protects the cellulosic layer in the subsequent freezing operation. The vinylidene chloride copolymer layer 83 is also in the nature of a moisture barrier and is intended to prevent juices from migrating to and through the cellulosic layer 81 during the cooking operation. The three layers remain in close contact with each other and on the stuffed product as the product expands during the cooking operation, subsequently contracts during cooling, and further expands as it is frozen. Both film layers 82 and 83 have comparatively low moisture transmission rates so that the product will not dehydrate even when frozen for extended periods of time.

One further application should be noted which, although not requiring an appreciation of all facets of this invention, does possess certain of its advantages. More particularly, in some applications such as stuffing of whole boneless hams into cellulosic casing, it is sometimes desirable to encase the stuffed product in a netting material. This allows the product to be hung during processing which produces a desirable teardrop shaped ham.

Heretofore, netting has applied to encased articles either in hand or semi-automated operations after the stuffing operation is completed. Consistently with the instant invention, it is possible to install a compressed length of netting material on the stuffing horn as the foremost stick and join the netting material to one or more coaxial casing lengths on the horn, such that the netting is applied to the encased product as it is stuffed. Operating in that way substantially reduces the time required to apply netting to an encased product since netting is applied directly during the stuffing operation and the only additional time required is that to install a compressed length on the horn.

While the present invention has been described in connection with its primary end use, stuffed food products, it is also useful for encasing other diverse products such as the sausage-shaped borehole explosives described in Slawinski U.S. Pat. No. 4,205,611.

We claim:

1. A composite casing article comprising at least two shirred casing lengths, all of said lengths having internal bores of sufficient diameter to receive a stuffing horn, the foremost length having an unshirred end of each other length passed through the bore thereof and positioned proximate an unshirred end of the foremost length so that all said unshirred ends can be brought together for joining, whereby said composite casing article is adapted to be tandem mounted on a stuffing horn, end joined, deshirred, and stuffed to form an encased product in a multi-layer composite casing.

2. A composite casing article comprising first and second shirred casing lengths formed of different materials, said shirred casing lengths having internal bores of sufficient diameter to receive a stuffing horn, one of the shirred lengths having an end unshirred and passed through the bore of the other, the unshirred end being proximate an unshirred end of said other shirred length and positioned for ready attachment thereto to form a composite casing article for simultaneous deshirring upon stuffing.

3. A composite casing article comprising at least two shirred casing lengths, all of said lengths being arranged in tandem to form a common bore of sufficient diameter to fit a stuffing horn, the foremost length having an unshirred end of each other length passed through the bore thereof and positioned proximate an unshirred end of the foremost length so that all said unshirred ends can be brought together for joining, whereby said composite casing article is adapted to be end joined, deshirred, and stuffed to form an encased product in a multi-layer composite casing.

4. The casing article as set out in claim 3 wherein all said unshirred ends are joined to form a closed unitary casing end adapted to cause all said casing lengths to deshirr upon stuffing.

5. The casing article as set out in claims 3 or 4 wherein the casing lengths are of respective predetermined circumference and are so constructed and arranged as to have extensibility and shrinkback properties coordinated to the circumference of the product during stuffing and processing, so that the composite casing is in close wrinkle-free contact on the stuffed processed product.

6. The casing article as set out in claim 4 wherein at least one of said casing lengths is unshirred through its own bore before joining with the other unshirred end, whereby said one casing length is turned inside out when deshirred.

7. A composite casing article comprising first and second shirred casing lengths formed of different materials, said shirred casing lengths being arranged in tandem to form a common bore of sufficient diameter to receive a stuffing horn, one of the shirred lengths having an end unshirred and passed through the bore of the other, the unshirred end being proximate an unshirred end of said other shirred length and positioned for ready attachment thereto to form a composite casing article for simultaneous deshirring upon stuffing.

8. The casing article as set out in claim 7 wherein the unshirred ends are joined to form a closed unitary casing end adapted to cause both said casing lengths to deshirr upon stuffing.

9. The casing article as set out in claims 7 or 8 wherein the casing lengths are of respective predetermined circumference and are so constructed and arranged as to have extensibly and shrinkback properties coordinated to the circumference of the product during stuffing and processing, so that the composite casing is in close wrinkle-free contact on the stuffed processed product.

10. The casing article as set out in claim 8 wherein at least one of said casing lengths is unshirred through its own bore before joining with the other unshirred end, whereby said one casing length is turned inside out when deshirred.

11. The casing article as set out in claim 8 further including sizing means implanted within the mated unshirred casing ends proximate the joined ends.

12. The casing article as set out in claim 11, wherein the sizing means is a sizing disc having a rim periphery greater than the unstretched circumference of the unshirred ends of both of the two casing lengths.

13. The casing article as set out in claims 11 or 12 wherein the casing lengths are of respective predetermined circumference and are so constructed and arranged as to have extensibility and shrinkback properties coordinated to the circumference of the product during stuffing and processing, the sizing means having an outer periphery also coordinated to the circumference of the stuffed product, so that said casing lengths are in close wrinkle-free contact on the stuffed processed product.

14. A casing article comprising a celulosic shirred length of casing, and a non-cellulosic shirred length of casing arranged in tandem with the cellulosic length to form a common bore or sufficient diameter to receive a stuffing horn, one of the shirred lengths having an end unshirred and passed through the bore of the other, said other shirred length having an end unshirred and mated with the unshirred end of said one and both said mated ends joined together for simultaneous deshirring and stuffing, thereby to produce upon stuffing a multi-layer casing.

15. The casing article as set out in claim 14 wherein the non-cellulosic casing length is a tube exhibiting the additional property of adhesion to a product to be stuffed, said tube being positioned to be adjacent the product when stuffed.

16. The casing article as set out in claim 14 wherein the non-cellulosic casing length is a film tube exhibiting the additional property of low oxygen permeability, thereby to minimize oxygen penetration to the stuffed product.

17. The casing article as set out in claim 14 wherein the non-cellulosic casing length is a film tube exhibiting the additional property of low moisture permeability, thereby to minimize moisture loss from the stuffed product.

18. The casing article as set forth in claim 14 further including sizing means implanted within the mated unshirred casing ends proximate the joined ends, the sizing means having a rim periphery greater than the unstretched circumference of both of the two casings, the circumferences and the stretch and shrinkback properties of the respective casing lengths being related to produce a multi-layer casing in close wrinkle-free contact on the stuffed processed product.

19. A composite shirred casing article intended to be stuffed with a food product and subsequently processed to produce a finished encased product, comprising two shirred casing lengths formed of different materials having different properties, the shirred casing lengths being arranged in tandem with an unshirred end of one within the bore of the other and joined to an unshirred end of said other for simultaneous deshirring upon stuffing, both casing lengths having sufficient extensibility to be stretched to the maximum desired circumference during stuffing and processing without rupture, both casing lengths also having sufficient shrinkability to stay in wrinkle-free contact on the encased product as it contracts during processing, thereby to form a finished encased product having a composite casing, the elements of which are in intimate wrinkle-free contact on the finished encased product and each providing its own properties thereto.

20. The casing article as set out in claim 19, wherein said one casing length is a vinylidene chloride copolymer film tube having a surface disposed for contact with the encased product, said surface providing the film with the property of adhesion to the food product during processing, said other casing length being a fibrous casing so constructed and arranged as to exert significant force on the encased product during processing and subsequent storage.

21. The casing article as set forth in claim 19 in which a first of said casing lengths is a vinylidene chloride copolymer film tube exhibiting the property of low oxygen permeability thereby to act as an oxygen barrier, a second of said casing lengths being a fibrous casing so constructed and arranged as to exert significant force on the encased product during processing and subsequent storage.

22. A composite shirred casing article intended to be stuffed with a food product and subsequently processed in preparation for consumption comprising, a fibrous shirred casing length and a film shirred casing length arranged in tandem to form a common bore of sufficient diameter to fit a stuffing horn, the film shirred casing length being rearmost and having an unshirred end within the bore of the fibrous casing length and joined to an unshirred end thereof for simultaneous deshirring upon stuffing, both casing lengths having sufficient extensibility to be stretched to the maximum circumference encountered during stuffing and processing without rupture, the fibrous casing length having sufficient shrinkability to control the uniformity of the diameter of the stuffed food product and maintain said stuffed food product under pressure after stuffing and during processing, the film casing length having sufficient shrinkability to avoid wrinkling upon shrinkage of the fibrous casing length, whereby said composite shirred casing article is adapted to produce a tight unwrinkled stuffed food product.

23. The composite shirred casing article as set out in claim 22 wherein the film shirred casing length includes means for causing said film to adhere to the stuffed food product.

24. The composite shirred casing article as set out in claim 22 wherein said film shirred casing length is a vinylidene chloride copolymer film having a surface thereof adapted to provide said surface with the property of adhesion to the stuffed food product, thereby to prevent buildup of liquid on the surface of said stuffed food product during processing.

25. The composite shirred casing article as set out in claim 22 wherein said film shirred casing length is an oxygen barrier.

26. The composite shirred casing article as set out in claim 22 wherein said film shirred casing length is a vinylidene chloride copolymer film processed to possess the characteristic of low oxygen permeability thereby to provide an oxygen barrier for the stuffed food product.

27. The composite shirred casing article as set out in claim 22 wherein the film shirred casing length is a moisture barrier.

28. The composite shirred casing article as set out in claim 27 wherein the film casing is exterior to the fibrous casing on the stuffed food product thereby to protect the fibrous casing from dehydration.

29. The composite shirred casing article as set out in claim 28 wherein the surface of the fibrous casing length which is to be in contact with the stuffed food product includes means for enhancing peelability from the stuffed food product.

30. A method of manufacturing a stuffed food product comprising the steps of placing at least two shirred casing lengths in tandem on a stuffing horn in such a way that ends of the rearmost lengths are unshirred, passed through the bore of the foremost length, and joined with an unshirred end of the foremost length; locating said tandem sticks on the stuffing horn with the joined ends proximate the end of the stuffing horn; and forcing a stuffable food product through the stuffing horn to simultaneously deshirr and stuff the resulting composite casing.

31. The method as set out in claim 30 wherein the step of placing includes placing one of said lengths on the stuffing horn with an unshirred end passed through its own bore.

32. The method as set out in claim 30 comprising the further step of matching the properties of the respective casing lengths to the required characteristics of the stuffed food product, such that stuffing and subsequent processing create a stuffed food product with a tight wrinkle-free composite casing.

33. A method of manufacturing a stuffed food product comprising the steps of providing a first shirred casing length having a characteristic property useful in a stuffing or processing operation for said food product, providing a second shirred casing length having a second characteristic property useful in a stuffing or processing operation for said food product, placing said casing lengths on a stuffing horn in tandem with an end of the rearmost length unshirred, passed through the bore of the foremost length and joined to an end of the foremost length proximate the end of the stuffing horn; stuffing a food product into the joined casings to produce a stuffed food product with a composite multilayer casing, and balancing the circumference, extensibility and shrinkability of the respective casing lengths such that the casing layers of the composite casing remain in close wrinkle-free contact on the stuffed processed food product.

34. The method as set out in claim 33 wherein the step of providing a first shirred casing length includes providing a fibrous shirred casing length adapted to maintain the stuffed food product under pressure during stuffing and subsequent processing, and the step of providing the second shirred casing length including providing a film shirred casing length comprising an oxygen barrier.

35. The method as set out in claim 34 wherein the step of providing the second shirred casing length includes providing a shirred vinylidene chloride copolymer casing length having the property of low oxygen permeability, thereby to minimize oxygen penetration to the stuffed food product.

36. The method as set out in claim 33 wherein the step of providing a first shirred casing length includes providing a fibrous shirred casing length adapted to maintain the stuffed food product under pressure during stuffing and subsequent processing, and the step of providing a second shirred casing length includes providing a barrier film shirred casing length having a surface in contact with the stuffed food product adapted to adhere to said stuffed food product.

37. The method as set out in claim 36 wherein the step of providing the second shirred casing length includes providing a vinylidene chloride copolymer film shirred casing length having a surface for contacting the stuffed food product, said surface being treated to comprise said surface as means for adhering to the stuffed food product.

38. The method as set out in claim 33 wherein the step of providing a first shirred casing length includes providing a fibrous shirred casing length adapted to maintain the stuffed food product under pressure during stuffing and subsequent processing, and the step of providing a second shirred casing length includes providing a film shirred casing length adapted to serve as a moisture barrier.

39. The method as set out in claim 38 wherein the step of placing includes placing the film shirred casing length on the stuffing horn nearest the discharge end thereof so that the film shirred casing length is external to the fibrous shirred casing length on the stuffed food product, thereby to protect the fibrous shirred casing length from dehydration during subsequent processing.

40. A method of manufacturing a stuffed food product comprising the steps of placing a pair of shirred casing sticks on the stuffing horn of a stuffing apparatus in tandem in such a way that an unshirred end of the rearmost casing stick is passed through the bore of the foremost casing stick and mated with an unshirred end of the foremost casing stick proximate the end of the stuffing horn, joining the mated ends together, stuffing a food product into the joined casings to simultaneously deshirr the two shirred casing sticks and form a contacting composite two layer casing, and joining the rear of the stuffed casing to form a food product encased in a double layered casing.

41. A method of manufacturing a stuffed food product comprising the steps of sheathing a pair of shirred casings onto a stuffing horn in tandem in such a way that an unshirred end of the rearmost casing is passed through the bore of the foremost casing and closed along with an unshirred end of the foremost casing, releasing a stuffable product from the discharge end of the stuffing horn to simultaneously deshirr and stuff both casings, closing the other end of the stuffed casing to form a stuffed product having a double layered casing, and matching the properties of the respective casings to maintain intimate contact between the respective casings and the stuffed product through stuffing and processing operations.

42. A method of manufacturing a stuffed food product comprising the steps of placing a shirred cellulosic casing stick and a shirred film casing stick on a stuffing horn of a stuffing apparatus in tandem in such a way that an unshirred end of the film casing stick is passed through the bore of the cellulosic casing stick and closed along with an unshirred end of the cellulosic casing stick, matching the circumference, extensibility and shrinkability of the cellulosic casing to the desired stuffed and processed circumference of the stuffed food product; matching the circumference, extensibility and shrinkability of the film casing to the desired stuffed and processed circumference of the stuffed food product so as to avoid wrinkling as the cellulosic casing maintains the food product under pressure; releasing a stuffable food product from the discharge end of the stuffing horn to simultaneously deshirr and stuff both casings, and closing the other end of the stuffed casing to form a stuffed food product having a double-layered casing.

43. The method as set out in claim 42, wherein the shirred film casing stick is a vinylidene chloride copolymer film, and including the steps of treating a surface of the vinylidene chloride copolymer film to provide the property of adhesion to the food product, and stuffing said casing sticks with the treated surface of the vinylidene chloride copolymer film in contact with the food product for adhesion thereto.

44. The method as set out in claim 42 including the step of adapting said film to exhibit the characteristic of low oxygen permeability, thereby to provide said stuffed food product with an oxygen barrier.

45. The method as set out in claim 44 wherein the shirred film casing stick is a vinylidene chloride copolymer film having an oxygen transmission rate of less than 8 cc/100 in$^2$/24 hrs./atm.

46. The method as set out in claim 42 including the step of adapting said film to exhibit the characteristic of low moisture permeability, thereby to provide said stuffed food product with a moisture barrier.

47. A method of manufacturing a stuffed food product comprising the steps of providing a cellulosic shirred casing length having a predetermined circumference and extensibility and shrinkability properties for controlling the stuffed and processed circumference of a stuffed food product, providing a film shirred casing length having a predetermined circumference and extensibility and shrinkability properties coordinated to said controlled stuffed and processed circumference and having an additional property desired for said stuffed food product, sheathing said shirred casing lengths onto a stuffing horn in tandem with an unshirred end of the film casing length passed through the bore of the cellulosic casing length and closed along with an unshirred end of the cellulosic casing length, releasing a stuffable food product from the discharge end of the stuffing horn to simultaneously deshirr and stuff both casings, closing the other end of the stuffed casing to form a stuffed food product within a double-layered casing, severing said stuffed food product from the shirred casing lengths, and processing said stuffed food product to produce a tight unwrinkled finished stuffed food product.

48. The method as set out in claim 47 wherein the film casing is a vinylidene chloride copolymer film and further comprising the steps of treating a surface of said vinylidene chloride copolymer film to provide thereto the property of adhesion to the food product, deshirring said vinylidene chloride copolymer film with the treated surface in contact with the stuffed food product thereby to avoid formation of gelatin and fat at the surface of the stuffed food product, and sticking the ends of the stuffed food product after cooking whereby subsequent shrinkage of said cellulosic casing serves to expel liquids from the ends of the stuffed food product.

49. The method as set out in claim 47 wherein said film casing is a vinylidene chloride copolymer film and further comprising the step of adapting said vinylidene chloride copolymer film to exhibit the characteristic of low oxygen permeability, thereby to provide the stuffed food product with an oxygen barrier.

50. The method as set out in claim 47 further comprising the step of adapting the film casing length to exhibit the characteristic of low moisture permeability thereby to provide the stuffed food product with a moisture barrier.

51. A method of manufacturing a composite casing article comprising the steps of providing two shirred casing lengths of different material and having different characteristics useful in a stuffing or processing operation for a food product, passing an unshirred end of one casing length through a bore of the other casing length for joining with an unshirred end of said other casing length, and arranging said casing lengths in tandem to form a common bore of sufficient diameter to receive a stuffing horn.

52. A method of manufacturing a composite casing article comprising the steps of providing a first shirred casing length having a characteristic property useful in a stuffing or processing operation for a food product, providing a second shirred casing length having a second characteristic property useful in a stuffing or processing operation for the food product, balancing the circumference, extensibility and shrinkability of the respective casing lengths to each other and to the requirements of the stuffed food product, arranging said casing lengths in tandem, and passing an unshirred end of the rearmost length through the bore of the foremost length for joining with an unshirred end of the foremost length.

* * * * *

UNITED STATES PATENT AND TRADEMARK OFFICE
CERTIFICATE OF CORRECTION

PATENT NO. : 4,470,171

DATED : September 11, 1984

INVENTOR(S) : Jerome J. M. Rasmussen and William F. Yearout, Jr.

It is certified that error appears in the above-identified patent and that said Letters Patent is hereby corrected as shown below:

On the title page:
In the heading, change inventor's name from "Jerome J. M. Rusmussen" to --Jerome J. M. Rasmussen--.

In Column 10, line 37, change "productrelated" to --product-related--.

Signed and Sealed this

Second Day of April 1985

[SEAL]

Attest:

DONALD J. QUIGG

Attesting Officer  Acting Commissioner of Patents and Trademarks